United States Patent
Kapadia et al.

(10) Patent No.: US 10,737,577 B2
(45) Date of Patent: Aug. 11, 2020

(54) CONTROL STRATEGY FOR CHARGING ELECTRIFIED VEHICLE OVER MULTIPLE LOCATIONS OF A DRIVE ROUTE

(71) Applicant: FORD GLOBAL TECHNOLOGIES, LLC, Dearborn, MI (US)

(72) Inventors: Jimmy Kapadia, Ottawa Hills, OH (US); Kenneth James Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 726 days.

(21) Appl. No.: 14/932,224

(22) Filed: Nov. 4, 2015

(65) Prior Publication Data

US 2017/0120761 A1 May 4, 2017

(51) Int. Cl.
*B60L 11/18* (2006.01)
*G06Q 20/14* (2012.01)
(Continued)

(52) U.S. Cl.
CPC ............ *B60L 11/184* (2013.01); *B60L 53/64* (2019.02); *B60L 53/665* (2019.02); *B60L 53/67* (2019.02); *B60L 53/68* (2019.02); *B60L 58/12* (2019.02); *G01C 21/343* (2013.01); *G01C 21/3469* (2013.01); *G06Q 20/145* (2013.01); *G07F 15/005* (2013.01); *B60L 2240/72* (2013.01); *B60L 2240/80* (2013.01); *B60L 2260/52* (2013.01); *B60L 2260/54* (2013.01); *G01C 21/3476* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 90/12* (2013.01);
(Continued)

(58) Field of Classification Search
CPC ... Y02T 90/166; Y02T 90/165; Y02T 90/164; Y02T 90/125; H02J 7/0027; B60L 2230/34; B60L 2230/00; B60L 11/1838
USPC ....................................................... 320/109
See application file for complete search history.

(56) References Cited

U.S. PATENT DOCUMENTS

| 7,849,944 B2 | 12/2010 | DeVault |
| 2008/0249667 A1 | 10/2008 | Horvitz et al. |

(Continued)

FOREIGN PATENT DOCUMENTS

EP    2792539 A2    10/2014

OTHER PUBLICATIONS

Bashash, et al., "Plug-In Hybrid Electric Vehicle Charge Pattern Optimization for Energy Cost and Battery Longevity," Control Optimization Laboratory, Department of Mechanical Engineering, The University of Michigan, Ann Arbor, MI 48109, USA.

(Continued)

*Primary Examiner* — Drew A Dunn
*Assistant Examiner* — Sailesh Thapa
(74) *Attorney, Agent, or Firm* — David B. Kelley; Carlson, Gaskey & Olds

(57) ABSTRACT

A method according to an exemplary aspect of the present disclosure includes, among other things, controlling charging of a battery pack of an electrified vehicle over a plurality of charging locations of a drive route, the controlling step including scheduling charging based at least on a cost to charge at each of the plurality of charging locations and an amount of charging time available at each of the plurality of charging locations.

16 Claims, 5 Drawing Sheets

(51) Int. Cl.
  *G07F 15/00* (2006.01)
  *B60L 53/64* (2019.01)
  *B60L 58/12* (2019.01)
  *B60L 53/66* (2019.01)
  *B60L 53/67* (2019.01)
  *B60L 53/68* (2019.01)
  *G01C 21/34* (2006.01)

(52) U.S. Cl.
  CPC .......... *Y02T 90/121* (2013.01); *Y02T 90/128* (2013.01); *Y02T 90/14* (2013.01); *Y02T 90/161* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2011/0282527 A1 | 11/2011 | Inbarajan et al. |
| 2012/0173134 A1* | 7/2012 | Gutman .............. G01C 21/3469 701/400 |
| 2013/0179061 A1 | 7/2013 | Gadh et al. |
| 2014/0288832 A1 | 9/2014 | Hoch et al. |
| 2015/0097512 A1 | 4/2015 | Li et al. |
| 2015/0149221 A1 | 5/2015 | Tremblay |
| 2015/0175026 A1 | 6/2015 | Uyeki |
| 2015/0185040 A1 | 7/2015 | Wu et al. |
| 2015/0202976 A1 | 7/2015 | Bridges et al. |
| 2017/0088000 A1* | 3/2017 | Payne ................. B60L 11/1838 |

OTHER PUBLICATIONS

Cao, et al., "An Optimized EV Charging Model Considering Tou Price and Soc Curve," IEEE Transactions on Smart Grid, vol. 3, No. 1, Mar. 2012, pp. 388-393.

* cited by examiner

CONTROL STRATEGY FOR CHARGING ELECTRIFIED VEHICLE OVER MULTIPLE LOCATIONS OF A DRIVE ROUTE

TECHNICAL FIELD

This disclosure relates to a vehicle system and method for an electrified vehicle. The vehicle system is adapted to control charging of an electrified vehicle by automatically prioritizing charging at more cost effective charging locations over less cost effective charging locations along a drive route.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines and may or may not have additional power sources such as an internal combustion engine. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. The battery pack is typically charged by connecting the vehicle to an external power source that transfers electric energy to the battery pack. The cost to charge the battery pack can vary from one charging location to another and can vary depending on the date and time at which the charging occurs.

SUMMARY

A method according to an exemplary aspect of the present disclosure includes, among other things, controlling charging of a battery pack of an electrified vehicle over a plurality of charging locations of a drive route, the controlling step including scheduling charging based at least on a cost to charge at each of the plurality of charging locations and an amount of charging time available at each of the plurality of charging locations.

In a further non-limiting embodiment of the foregoing method, the controlling step includes determining a drive route expected to be traveled by the electrified vehicle.

In a further non-limiting embodiment of either of the foregoing methods, determining the drive route includes inferring the drive route based on historical route information associated with the electrified vehicle.

In a further non-limiting embodiment of any of the foregoing methods, the method includes determining a location of each of the plurality of charging locations that are available along the drive route.

In a further non-limiting embodiment of any of the foregoing methods, the method includes determining the cost to charge associated with each of the plurality of charging locations.

In a further non-limiting embodiment of any of the foregoing methods, the method includes creating a charging schedule for charging the battery pack along the drive route, the charging schedule including instructions for prioritizing charging at a first charging location of the plurality of charging locations over charging at a second charging location of the plurality of charging locations.

In a further non-limiting embodiment of any of the foregoing methods, the controlling step includes prioritizing charging at the first charging location if the cost to charge at the first charging location is less than the cost to charge at the second charging location.

In a further non-limiting embodiment of any of the foregoing methods, the controlling step includes executing a charge optimization sequence for determining an amount of charging that is to occur for charging the battery pack at each of the plurality of charging locations.

In a further non-limiting embodiment of any of the foregoing methods, the charge optimization sequence includes creating a charging schedule for charging at each of the plurality of charging locations.

In a further non-limiting embodiment of any of the foregoing methods, the method includes determining a Route Confidence Value and an SOC Safety Margin for a remaining portion of the drive route upon arriving at a first charging location of the drive route.

In a further non-limiting embodiment of any of the foregoing methods, the method includes determining whether the first charging location is a cheapest charging location along the drive route.

In a further non-limiting embodiment of any of the foregoing methods, the method includes charging the battery pack to a 100% SOC if the first charging location is the cheapest charging location along the drive route.

In a further non-limiting embodiment of any of the foregoing methods, the method includes calculating a distance to a next cheapest charging location if the first charging location is not the cheapest charging location along the drive route.

In a further non-limiting embodiment of any of the foregoing methods, the method includes charging the battery pack to a target SOC that is sufficient to travel the distance to a next cheapest charging location.

In a further non-limiting embodiment of any of the foregoing methods, the method includes determining a 95% Confidence Charge Time associated with both the first charging location and the next cheapest charging location.

A vehicle system according to another exemplary aspect of the present disclosure includes, among other things, a battery pack, a charging system configured to selectively charge the battery pack and a control system configured to instruct charging of the battery pack based on a charging schedule that includes instructions for prioritizing charging of the battery pack at a first charging station along a drive route over charging at a second charging station of the drive route.

In a further non-limiting embodiment of the foregoing vehicle system, a navigation system is configured to communicate information regarding the drive route to the control system.

In a further non-limiting embodiment of either of the foregoing vehicle systems, the control system includes at least one control module configured to execute a charge optimization sequence for charging the battery pack along the drive route.

In a further non-limiting embodiment of any of the foregoing vehicle systems, the charging system includes a switch selectively actuated to shut-off charging of the battery pack.

In a further non-limiting embodiment of any of the foregoing vehicle systems, the control system is configured to prepare the charging schedule based at least on a cost to charge at each of the first charging location and the second charging location and an amount of charging time available at each of the first charging location and the second charging location.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle system for controlling charging of an electrified vehicle over multiple charging locations of a drive route. An exemplary charging control strategy includes prioritizing charging at a first charging location over charging at a second charging location of the drive route based at least on a cost to charge at each charging location and the estimated amount of time available for charging at each charging location. These and other features are discussed in greater detail in the following paragraphs of this detailed description.

Figure 1:
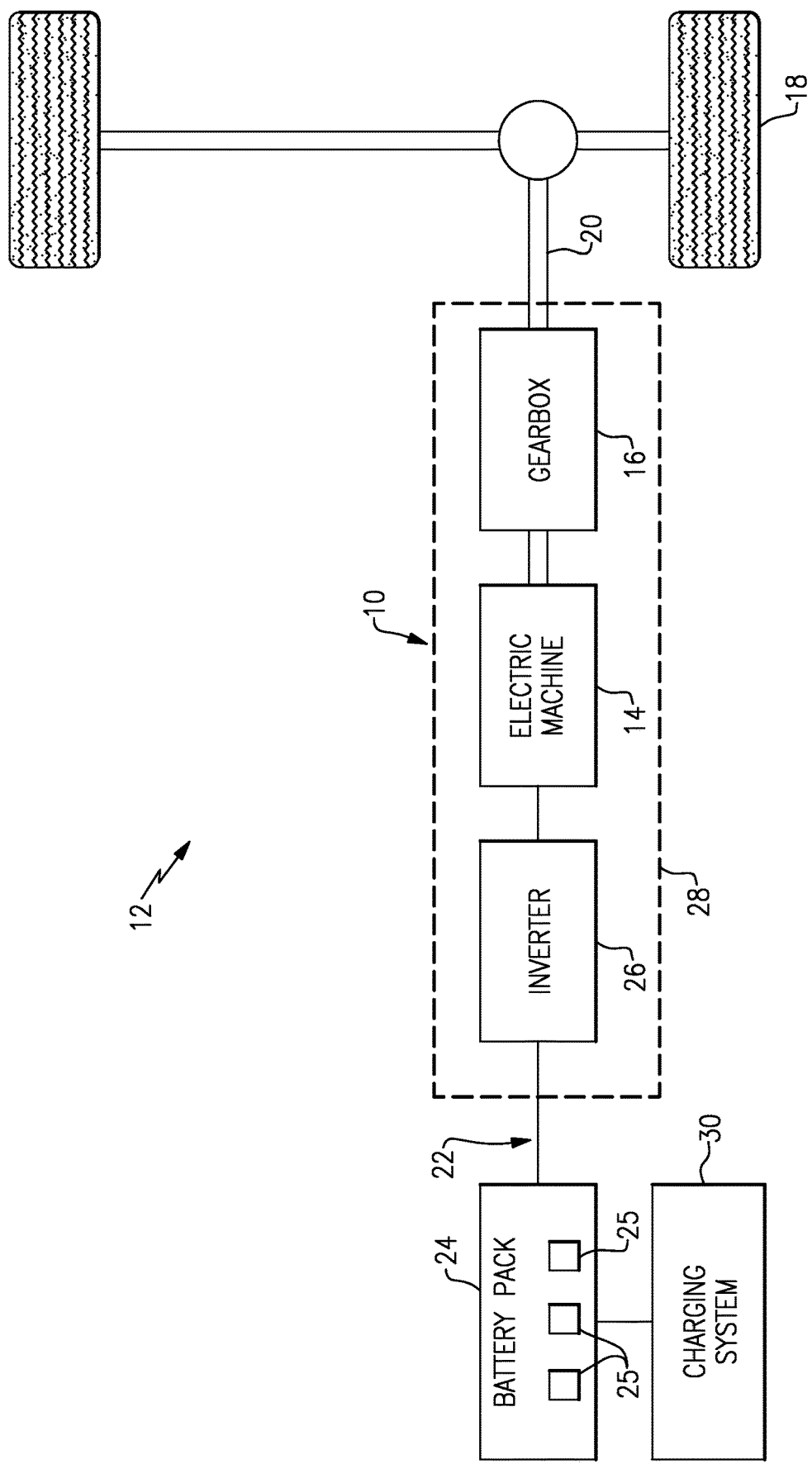
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's), and fuel cell vehicles. Therefore, although not shown in this embodiment, the electrified vehicle 12 could be equipped with an internal combustion engine that can be employed either alone or in combination with other energy sources to propel the electrified vehicle 12.

In one non-limiting embodiment, the electrified vehicle 12 is a full electric vehicle propelled solely through electric power, such as by an electric machine 14, without assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for charging the energy storage devices (e.g., battery cells) of the battery pack 24. The charging system 30 may be connected to an external power source (not shown) for receiving and distributing power. The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
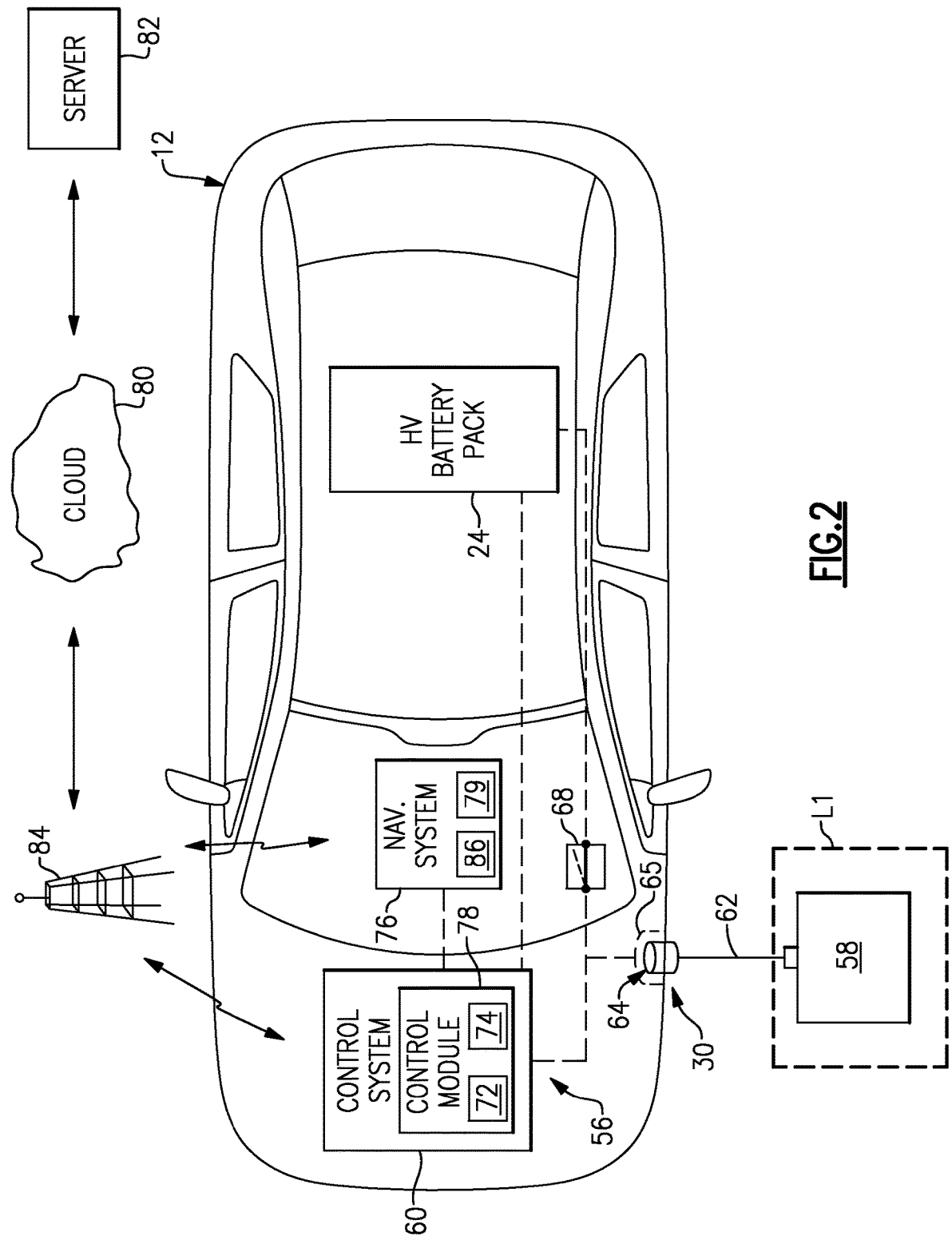
FIG. 2 illustrates a vehicle system of an electrified vehicle.

FIG. 2 is a highly schematic depiction of a vehicle system 56 that may be employed within an electrified vehicle, such as electrified vehicle 12 of FIG. 1. The various components of the vehicle system 56 are shown schematically to better illustrate the features of this disclosure. These components; however, are not necessarily depicted in the exact locations at which they would be found in an actual vehicle.

The vehicle system 56 is adapted to control charging of a high voltage battery pack 24 over multiple locations of a drive route. For example, in one non-limiting embodiment, the vehicle system 56 prioritizes charging at more cost effective charging locations over less cost effective charging locations along the drive route based the cost to charge at each charging location of the drive route and the amount of time available for charging at each charging location.

In one non-limiting embodiment, the exemplary vehicle system 56 includes the battery pack 24, a charging system 30, a control system 60 and a navigation system 76. The battery pack 24 may include one or more battery assemblies each having a plurality of battery cells or other energy storage devices. The energy storage devices of the battery pack 24 store electrical energy that is selectively supplied to power various electrical loads residing onboard the electrified vehicle 12. These electrical loads may include various high voltage loads (e.g., electric machines, etc.) or various low voltage loads (e.g., lighting systems, low voltage batteries, logic circuitry, etc.). The energy storage devices of the battery pack 24 are depleted of energy over time and therefore must be periodically recharged. Recharging can be achieved using the charging system 30 based on a charging control strategy executed by the control system 60, the details of which are further discussed below.

The charging system 30 may include a power cord 62 that connects between a charging port 64 of a vehicle connector 65 (located onboard the electrified vehicle 12) and an external power source 58. The external power source 58 could be grid power, solar power, or any other power source. The external power source 58 is located at a charging location L1. Exemplary charging locations include but are not limited to a public charging station located along the drive route, a driver's home, or a parking garage. Power from the external power source 58 may be selectively transferred to the electrified vehicle 12 for charging the energy storage devices of the battery pack 24 via the power cord 62.

The charging system 30 may be equipped with power electronics configured to convert AC power received from the external power source to DC power for charging the energy source devices of the battery pack 24. The charging system may also be configured to accommodate one or more conventional voltage sources from the external power source 58. In still other embodiments, the charging system 30 could be a wireless charging system or a DC charging system.

In yet another non-limiting embodiment, the charging system 30 includes a switch 68 for controlling the transfer of power to the battery pack 24. The switch 68 can be selectively actuated (i.e., opened) to stop charging the battery pack 24, such as when the battery pack 24 reaches a target state of charge (SOC) level at the charging location L1. In one non-limiting embodiment, the switch 68 is movable between a closed position (shown in solid lines) in which power is permitted to flow to the battery pack 24 and an open position (shown in phantom lines) in which power is prohibited from flowing to the battery pack 24.

The control system 60 of the vehicle system 56 may control charging of the battery pack 24. For example, as further discussed below, the control system 60 may schedule the charging of the battery pack 24 such that charging is spread out over multiple charging locations of the drive route in order to take advantage of the charging locations that provide more cost effective charging. The control system 60 may additionally control when charging begins at each charging location, the length of charging, the power levels of the charging, etc.

The control system 60 may be part of an overall vehicle control system or could be a separate control system that communicates with the vehicle control system. The control system 60 may include one or more control modules 78 equipped with executable instructions for interfacing with and commanding operation of various components of the vehicle system 56. For example, in one non-limiting embodiment, each of the battery pack 24, the charging system 30 and the navigation system 76 include a control module, and these control modules can communicate with one another over a controlled area network to control charging of the battery pack 24. In another non-limiting embodiment, each control module 78 of the control system 60 includes a processing unit 72 and non-transitory memory 74 for executing the various control strategies and modes of the vehicle system 56. One exemplary charging control strategy is further discussed below.

The vehicle system 56 may optionally include the navigation system 76. The navigation system 76 may include a global positioning system (GPS) configured for communicating drive route information to the control system 60. The navigation system 76 may include a user interface 79 located inside the electrified vehicle 12 for displaying the drive route and other related information. A user may interact with the user interface 79 via a touch screen, buttons, audible speech, speech synthesis, etc. In one non-limiting embodiment, the drive route can be manually entered into the navigation system 76 using the user interface 79. In another non-limiting embodiment, the drive route can be inferred based on historical data accumulated from prior drive routes the user has planned/traveled. Such historical route information may be saved within the navigation system 76 or within the non-transitory memory 74 of the control module 78 of the control system 60, for example.

The navigation system 76 may communicate additional information to the control system 60. This information could include the location of various charging locations along the drive route, charging costs associated with each charging location, traffic information, etc. The information collected and monitored by the control system 60 is not intended to provide an exhaustive list or limited disclosure in any way. Other information may be collected and monitored by the control system 60 and may be considered when scheduling charging across multiple locations of the drive route.

In one non-limiting embodiment, the navigation system 76 (or the control system 60 itself) may communicate over a cloud 80 (i.e., the internet) to obtain various information stored on a server 82. The server 82 can identify, collect and store user data associated with the electrified vehicle 12 for validation purposes. Upon an authorized request, data may be subsequently transmitted to the navigation system 76, or directly to the control system 60, via a cellular tower 84 or some other known communication technique. The navigation system 76 may include a transceiver 86 for bidirectional communication with the cellular tower 84. For example, the transceiver 86 can receive data from the server 82 or can communicate data back to the server 82 via the cellular tower 84. Although not necessarily shown or described in this highly schematic embodiment, numerous other components may enable bidirectional communication between the electrified vehicle 12 and the web-based server 82. In another non-limiting embodiment, the data received by the transceiver 86 may be communicated to the control system 60. The control system 60 is programmed with the necessary hardware and software for controlling various systems of the electrified vehicle 12.

The data received by the control system 60 from the navigation system 76 and/or the server 82 may be used to create a charging schedule that optimizes charging over multiple charging locations of a given drive route. The control system 60 may gather, analyze and/or calculate various data when planning the charging schedule. In one non-limiting embodiment, the control system 60 is configured to infer a "Route Confidence Value" as part of generating a charging schedule for a drive route. The Route Confidence Value, which may be represented as a percentage (%), represents the relative degree of confidence the control system 60 has that the inferred drive route will be the actual route driven by the electrified vehicle 12 and that the estimated energy required to drive that drive route will be equal to the actual energy required to drive the drive route. The control system 60 may estimate the Route Confidence Value based on historical drive route data (e.g., stored route information associated with specific dates, times of day, days of week, etc.), and the present traffic conditions along the route. If the drive route is anticipated to be a typical drive route driven by the user, such as the route taken Monday through Friday from home to work and back, for example, then the Route Confidence Value can be set at a relatively high percentage (e.g., 90% or higher). However, if the drive route is anticipated to be a route not frequently driven, such as a route only occasionally driven on the weekends, then the Route Confidence Value can be set at a lower percentage (e.g., less than 90%). In another non-limiting embodiment, the Route Confidence Value can be set at a relatively high value (e.g., 90% or more) if the user manually enters the anticipated drive route into the navigation system 76 using the user interface 79. In yet another non-limiting embodiment, the Route Confidence Value can be set at an even higher value (e.g., 95% or more) if the electrified vehicle 12 is an autonomous vehicle and thus the drive route, vehicle speeds, vehicle accelerations and vehicle decelerations will be largely known values.

The Route Confidence Value may be utilized by the control system 60 to estimate a "SOC Safety Margin." The SOC Safety Margin is a calibrated value that may be expressed as a percentage (%) and represents an amount added to the state of charge that is to be reached at each charging location of the drive route to reduce the risk that the electrified vehicle 12 will have an insufficient SOC to reach a given destination along the drive route. In one non-limiting embodiment, the SOC Safety Margin may range between 0% and 30% of an estimated SOC. The SOC Safety Margin is determined as a function of the Route Confidence Value and is therefore based on the probability that the estimate drive route has been correctly inferred. For example, in one non-limiting embodiment, the SOC Safety Margin is set as a relatively high value (i.e., closer to 30%) if the Route Confidence Value is estimated to be a lower confidence value (i.e., below 90%) and is set as a relatively low value (i.e., closer to 0%) if the Route Confidence Value is estimated to be a higher confidence value (i.e., above 90%). In other words, the SOC Safety Margin has an inverse relationship to the Route Confidence Value.

In another non-limiting embodiment, the control system 60 is configured to estimate the charging locations that are available and that will likely be used along the drive route. This determination may be based on historical data associated with the drive route, in one non-limiting embodiment. The control system 60 may additionally estimate the time of day at which the electrified vehicle will likely be located at each charging location and a cost to charge associated with each charging location. The cost to charge and charge rate of each charging location may be estimated based on information obtained from the server 82, in one non-limiting embodiment.

In yet another non-limiting embodiment, the control system 60 is configured to estimate a "95% Confidence Charge Time" for each charging location that is planned to be used to charge the electrified vehicle 12 along the drive route. The 95% Confidence Charge Time can be expressed in units of hours and represents an amount of time that the control system 60 is 95% confident that the electrified vehicle will be "on charge" at each of the charging locations. The 95% Confidence Charge Time may be estimated based on historical data. For example, if the charging location is the user's home and the electrified vehicle 12 is typically "on charge" for between 4 and 8 hours, the 95% Confidence Charge Time can be set as the value of 4 hours (e.g., the lower range of the historical data). Conversely, if the charging location is a public charging station and the electrified vehicle 12 is typically "on charge" for 15 minutes to 2 hours, the 95% Confidence Charge Time can be set at 0.25 hours. These values are provided as non-limiting examples and are not intended to limit this disclosure.

Figure 3:
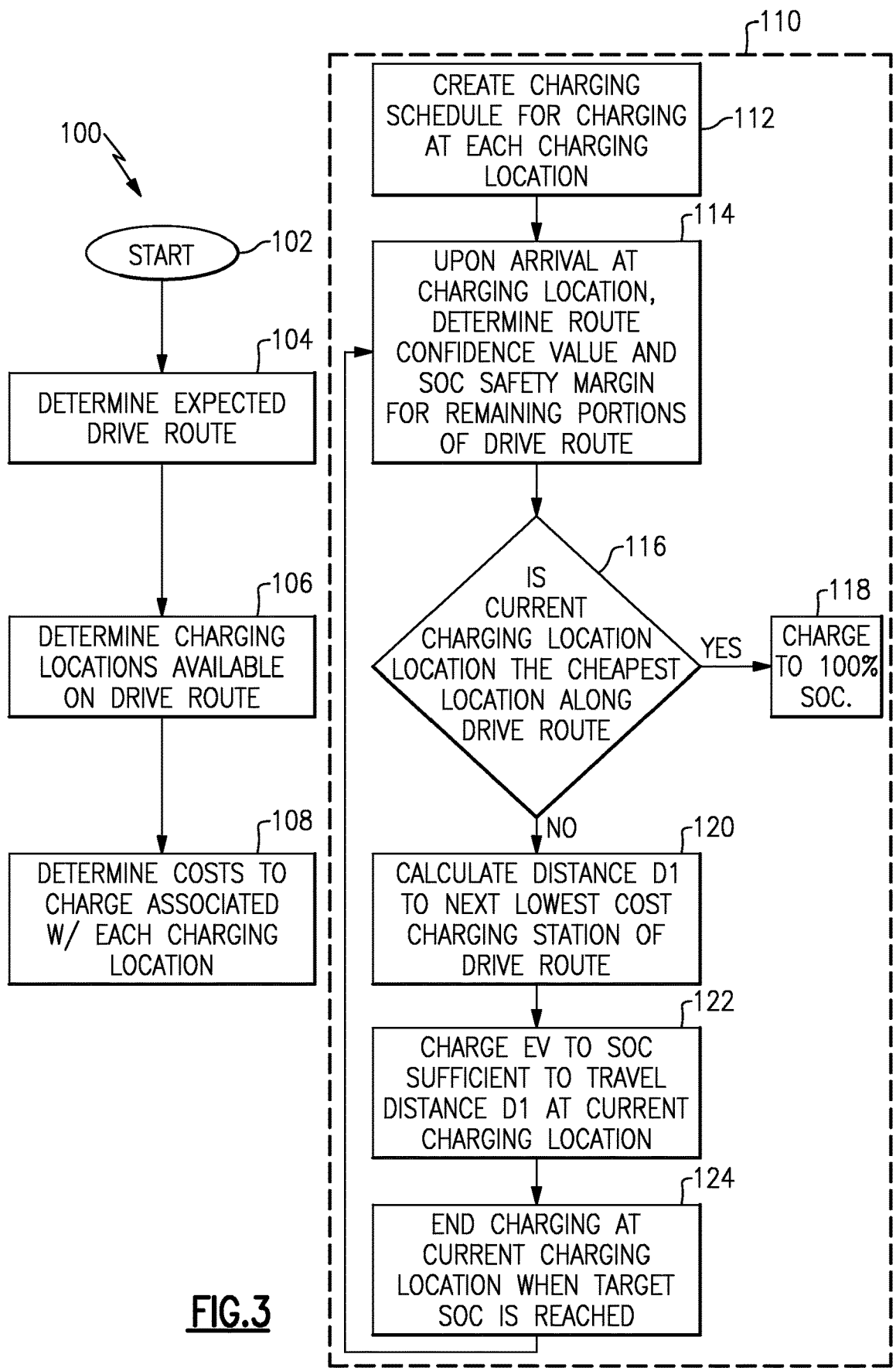
FIG. 3 schematically illustrates a control strategy for controlling charging of a battery pack of an electrified vehicle.

FIG. 3, with continued reference to FIGS. 1 and 2, schematically illustrates a control strategy 100 for controlling the vehicle system 56 of the electrified vehicle 12. For example, the control strategy 100 can be performed to control charging of the electrified vehicle 12 over multiple charging locations of a drive route. In one non-limiting embodiment, the control system 60 of the vehicle system 56 is programmed with one or more algorithms adapted to execute the exemplary control strategy 100, or any other control strategy. In another non-limiting embodiment, the control strategy 100 is stored as executable instructions in the non-transitory memory 74 of the control module(s) 78 of the control system 60.

The control strategy 100 begins at block 102. At block 104, the control strategy 100 determines a drive route that the electrified vehicle 12 is next expected to travel. The drive route may be inferred based on historical route data associated with a given date, day and time of the week. The drive route could alternatively be determined based on instructions from the user, such as by the user manually entering a specific drive route into the navigation system 76.

Next, at block 106, the control strategy 100 determines the charging locations that are available on the drive route during the time the electrified vehicle 12 is expected to travel along the drive route. The cost to charge, which can be expressed in units of $/kWh, associated with each charging location may be obtained at block 108. In one non-limiting embodiment, the navigation system 76 is configured to obtain the location of each charging location along the drive route and the cost to charge associated with each of these charging locations by communicating with the web based server 82 via the cellular tower 84.

The control strategy 100 may next undergo a charge optimization 110 (shown schematically in dashed lines in FIG. 3) for determining an amount of charging that will occur for charging the electrified vehicle 12 at each charging location (as determined at block 106). The charging optimization sequence 110 is designed to optimize the quantity of charge at each charging location and determine the times to begin and end charging at each charging location. Stated another way, the charging optimization sequence 110 is operable to prioritize charging at those charging locations having cheaper costs to charge over other charging locations having more expensive costs to charge.

Block 112 illustrates a first step of the charge optimization sequence 110. At block 112, the control strategy 100 creates a charging schedule for charging the battery pack 24 of the electrified vehicle 12 at each of the multiple charging locations of the drive route. The charging schedule may include information such as the SOC to charge up to at each charging location of the drive route. This calculation can be based on at least the cost to charge at each charging location and the amount of time available for charging at each charging location. Other factors that may be relevant for planning and preparing the charging schedule include but are not limited to the starting SOC of the battery pack 24, the charge rate available at each charging location, and the relevant SOC Safety Margins. In one non-limiting embodiment, the SOC to charge up to at each charging location can be determined by the control system 60 using the various information detailed above.

Next, at block 114, upon arrival at a first charging location along the drive route, the control strategy 100 may determine a Route Confidence Value and SOC Safety Margin for the remaining portions of the drive route. The control strategy 100 may then determine whether the first charging location is the cheapest charging location on the remaining portion of the drive route at block 116. If YES, the electrified vehicle 12 is charged to 100% SOC at block 118.

Alternatively, if the answer is NO at block 116, the control strategy 100 proceeds to block 120 and calculates a distance D1 and charge consumed to reach the next lowest cost charging location on the drive route with the current available SOC (including built-in SOC Safety Margin). The electrified vehicle 12 is charged at the first charging location, at block 122, only to an SOC sufficient to drive the distance D1 necessary to reach the next cheapest charging location.

The control strategy 100 may charge an additional amount at the first charging station if it is determined that the 95% Confidence Charge Time for the next cheapest charging location does not allow enough time to reach the desired SOC.

Once the target SOC has been reached at the first charging station, the control system 60 may command the charging system 30 to stop charging at block 124. In one non-limiting embodiment, charging is stopped by actuating (i.e., opening) the switch 68.

Steps 114 to 124 of the charge optimization sequence 110 of the control strategy 100 may be repeated once the electrified vehicle 12 reaches each subsequent charging location of the drive route. In this way, the charging schedule may be continuously updated during the drive route to continuously optimize the amount of charging that occurs at each charging location.

Figure 4A:
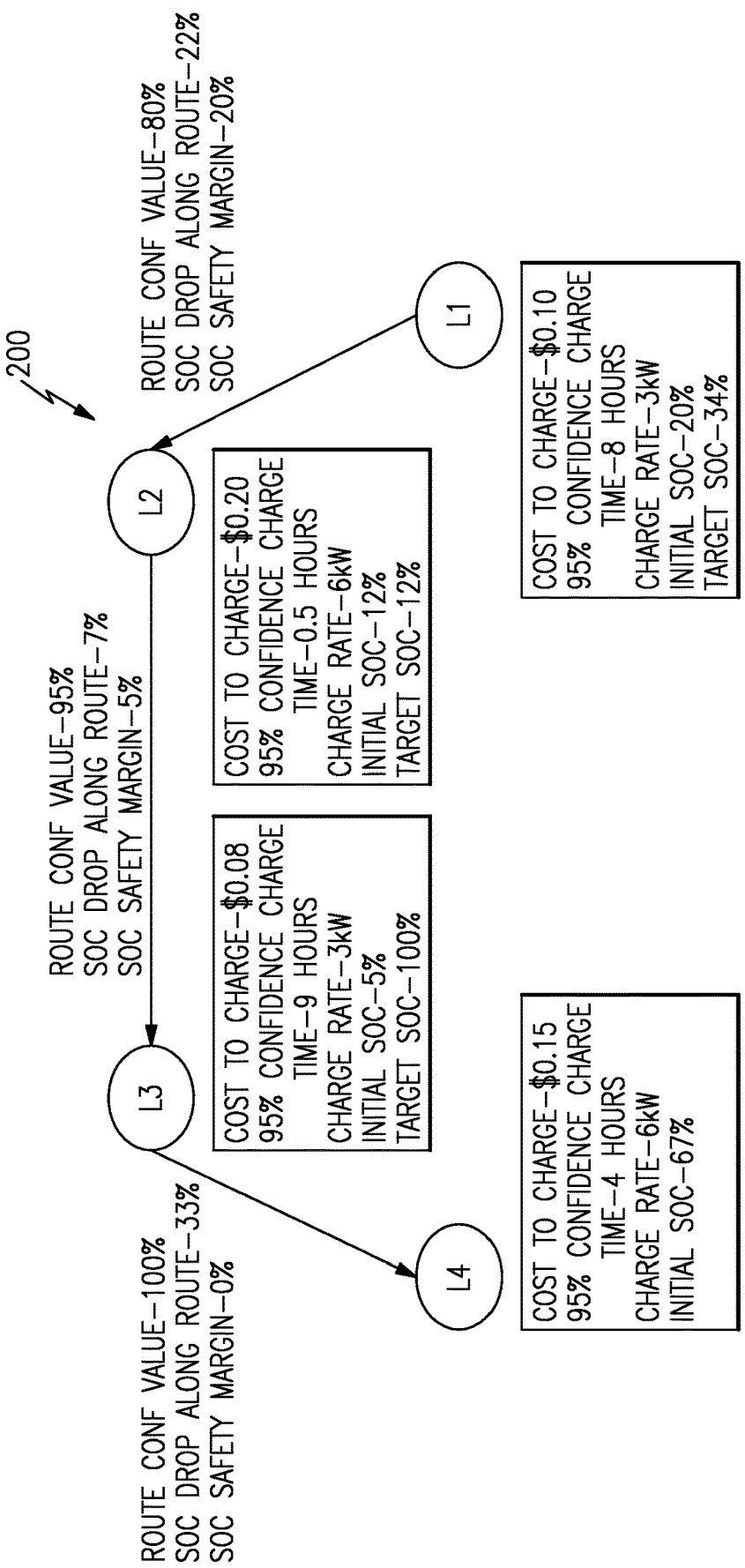
FIGS. 4A and 4B schematically illustrate exemplary implementations of the control strategy illustrated in FIG. 3.
Figure 4B:
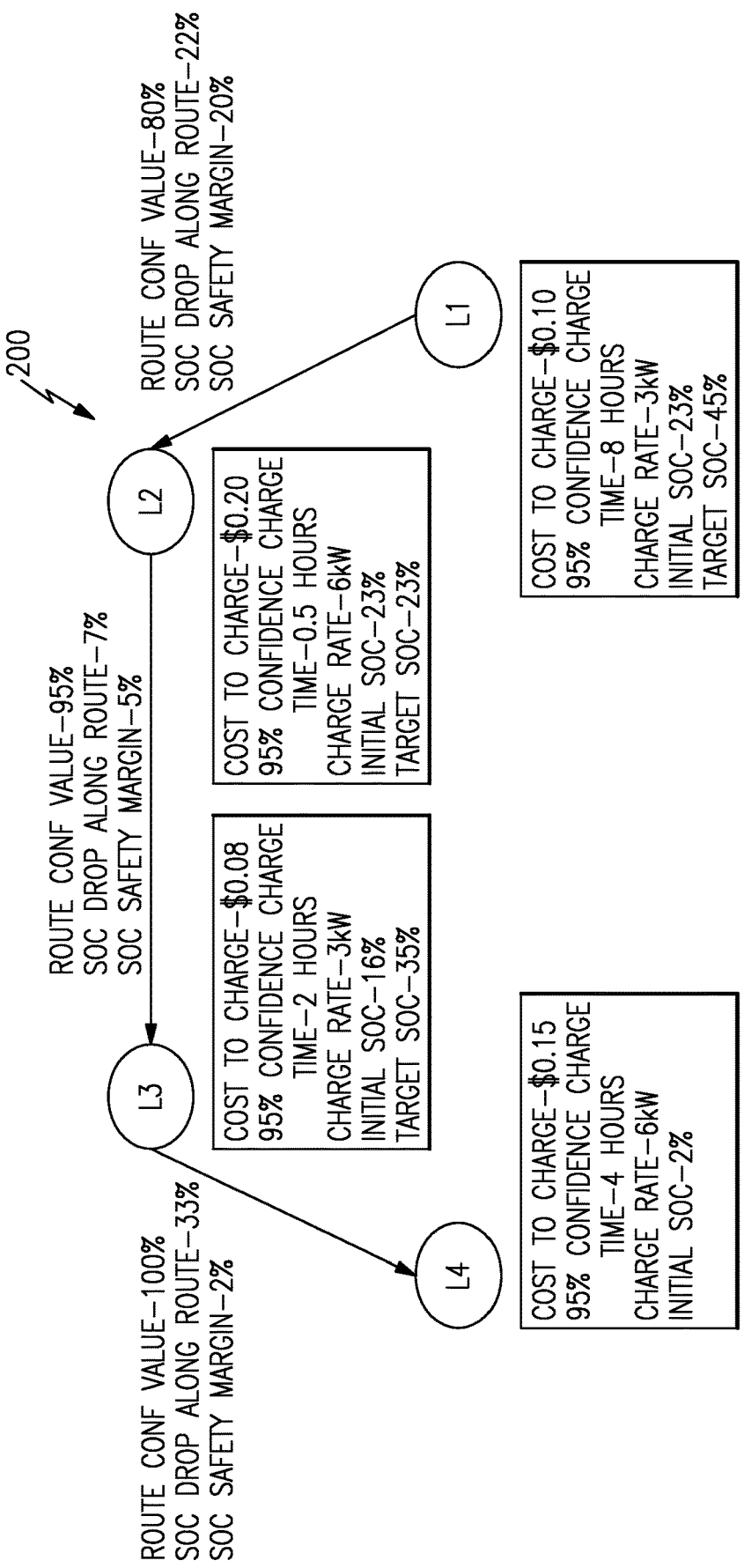

FIGS. 4A and 4B schematically illustrate exemplary implementations of the control strategy 100 described by FIG. 3. These examples are provided for illustrative purposes only, and therefore, the specific values and parameters indicated in these Figures and are not intended to limit this disclosure in any way.

Referring first to FIG. 4A, it has been inferred that the electrified vehicle 12 is expected to travel along a drive route 200 that includes charging locations L1, L2, L3 and L4. In this example, the charging location L1 is determined to be the second cheapest charging location (cost to charge of $0.10/kWh) and the charging location L3 is determined to be the cheapest charging location (cost to charge of $0.08/kWh). Therefore, the control system 60 may create a charging schedule that charges the battery pack 24 at the charging location L1 only to a target SOC that is sufficient (with SOC Safety Margin factored in based on Route Confidence Values) to reach the charging station L3. Since the 95% Confidence Charge Time at charging location L3 is greater than that of the charging location L1, the battery pack 24 can be charged to a 100% SOC at the charging location L3. In addition, since the cost to charge at charging location L2 is the most expensive of the drive route 200, charging can be completely avoided at this charging location.

The example illustrated in FIG. 4B is similar to that of FIG. 4A except that it is determined that the 95% Confidence Charge Time available at charging location L3, which is the cheapest charging location, is only 2 hours instead of 9 hours. Therefore, the control system 60 can determine that more charging is required at charging location L1 (up to 45% SOC rather than 34% SOC, in this example), which is the second cheapest charging location.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method to control charging of a battery pack of an electrified vehicle over a plurality of charging locations of a drive route, comprising:
scheduling charging of the vehicle, via a vehicle control system, at each of the plurality of charging locations based at least on a cost to charge at each of the plurality of charging locations and an amount of charging time available at each of the plurality of charging locations, wherein scheduling charging includes estimating a confidence value that represents an amount of time that the vehicle control system is confident that the vehicle will be on charge at each of the plurality of charging locations wherein controlling the charging includes executing a charge optimization sequence for determining an amount of charging that is to occur for charging the battery pack at each of the plurality of charging locations,
wherein the charge optimization sequence includes creating a charging schedule for charging at each of the plurality of charging locations;
determining a Route Confidence Value and an SOC Safety Margin for a remaining portion of the drive route upon arriving at a first charging location of the drive route,
determining whether the first charging location is a cheapest charging location along the drive route; and
charging the battery pack to a 100% SOC if the first charging location is the cheapest charging location along the drive route.

2. The method as recited in claim 1, wherein controlling the charging includes determining a drive route expected to be traveled by the electrified vehicle.

3. The method as recited in claim 2, wherein determining the drive route includes inferring the drive route based on historical route information associated with the electrified vehicle.

4. The method as recited in claim 2, comprising determining a location of each of the plurality of charging locations that are available along the drive route.

5. The method as recited in claim 4, comprising determining the cost to charge associated with each of the plurality of charging locations.

6. The method as recited in claim 4, wherein the charging schedule including instructions for prioritizing charging at the first charging location of the plurality of charging locations over charging at a second charging location of the plurality of charging locations.

7. The method as recited in claim 6, wherein controlling the charging includes prioritizing charging at the first charging location if the cost to charge at the first charging location is less than the cost to charge at the second charging location.

8. The method as recited in claim 1, comprising calculating a distance to a next cheapest charging location if the first charging location is not the cheapest charging location along the drive route.

9. A method to control charging of a battery pack of an electrified vehicle over a plurality of charging locations of a drive route, comprising:
scheduling charging of the vehicle, via a vehicle control system, at each of the plurality of charging locations based at least on a cost to charge at each of the plurality of charging locations and an amount of charging time available at each of the plurality of charging locations, wherein scheduling charging includes estimating a confidence value that represents an amount of time that the vehicle control system is confident that the vehicle will be on charge at each of the plurality of charging locations,
wherein controlling the charging includes executing a charge optimization sequence for determining an amount of charging that is to occur for charging the battery pack at each of the plurality of charging locations,
wherein the charge optimization sequence includes creating a charging schedule for charging at each of the plurality of charging locations;
determining a Route Confidence Value and an SOC Safety Margin for a remaining portion of the drive route upon arriving at a first charging location of the drive route, determining whether the first charging location is a cheapest charging location along the drive route;
calculating a distance to a next cheapest charging location if the first charging location is not the cheapest charging location along the drive route; and
comprising charging the battery pack to a target SOC that is sufficient to travel the distance to a next cheapest charging location.

10. The method as recited in claim 9, comprising: determining a 95% Confidence Charge Time associated with both the first charging location and the next cheapest charging location.

11. A vehicle system, comprising:
a battery pack;
a charging system configured to selectively charge the battery pack; and
a control system configured with instructions for creating a charging schedule that prioritizes charging of the battery pack at a first charging station along a drive route over charging at a second charging station of the drive route, wherein the charging schedule includes a confidence value estimation of an amount of time that the control system is confident that the vehicle will be on charge at each of the first and second charging stations,
wherein the control system includes at least one control module configured to execute a charge optimization sequence for charging the battery pack along the drive route.

12. The vehicle system as recited in claim 11, comprising a navigation system configured to communicate information regarding the drive route to the control system.

13. The vehicle system as recited in claim 11, wherein the charging system includes a switch selectively actuated to shut-off charging of the battery pack.

14. The vehicle system as recited in claim 11, wherein said control system is configured to prepare the charging schedule based at least on a cost to charge at each of the first charging location and the second charging location and an amount of charging time available at each of the first charging location and the second charging location.

15. A method, comprising:
controlling charging of a battery pack of an electrified vehicle over a plurality of charging locations of a drive route with a vehicle control system, wherein controlling the charging includes estimating a confidence value that represents an amount of time that the vehicle control system is confident that the vehicle will be on charge at each of the plurality of charging locations.

16. The method as recited in claim 15, wherein said confidence value is a 95% Confidence Charge Time value.

* * * * *

UNITED STATES PATENT AND TRADEMARK OFFICE
CERTIFICATE OF CORRECTION

PATENT NO. : 10,737,577 B2
APPLICATION NO. : 14/932224
DATED : August 11, 2020
INVENTOR(S) : Jimmy Kapadia and Kenneth James Miller It is certified that error appears in the above-identified patent and that said Letters Patent is hereby corrected as shown below:

In the Claims

In Claim 1, Column 10, Line 15; add a --,-- and a line break after "the plurality of charging locations"

In Claim 9, Column 11, Line 15; add a line break after "of the drive route,"

Signed and Sealed this
First Day of March, 2022

Drew Hirshfeld
*Performing the Functions and Duties of the*
*Under Secretary of Commerce for Intellectual Property and*
*Director of the United States Patent and Trademark Office*